(12) United States Patent
Kita et al.

(10) Patent No.: US 8,080,083 B2
(45) Date of Patent: Dec. 20, 2011

(54) METHOD AND APPARATUS FOR CONVERTING OXIDIZED MERCURY INTO ELEMENTAL MERCURY

(75) Inventors: Dieter Kita, Blackstone, MA (US); James H. Grassi, Westwood, MA (US); Jeffrey Socha, Berlin, MA (US); Dirk Appel, Salem, MA (US)

(73) Assignee: Thermo Fisher Scientific Inc., Waltham, MA (US)

( * ) Notice: Subject to any disclaimer, the term of this patent is extended or adjusted under 35 U.S.C. 154(b) by 0 days.

(21) Appl. No.: 12/613,777

(22) Filed: Nov. 6, 2009

(65) Prior Publication Data

US 2010/0111788 A1  May 6, 2010

Related U.S. Application Data

(63) Continuation of application No. 11/120,315, filed on May 2, 2005, now abandoned.

(51) Int. Cl.
*C22B 43/00* (2006.01)
(52) U.S. Cl. ............... 75/670; 423/210; 436/81
(58) Field of Classification Search .......... 266/144–159, 266/265–270; 423/99, 107, 210; 436/43, 436/81, 155; 73/1.02, 19.01–31.07, 37–49.8, 73/863–864.91; 75/392, 414, 431, 585, 586, 75/670, 742; 148/508; *C22B 43/00, 5/12, C22B 5/14, 5/16; G01N 33/20, 21/64*
See application file for complete search history.

(56) References Cited

U.S. PATENT DOCUMENTS

| | | | |
|---|---|---|---|
| 3,763,877 A * | 10/1973 | Lieb ..................... | 137/115.09 |
| 3,826,618 A | 7/1974 | Capuano | |
| 3,844,719 A | 10/1974 | Hammitt | |
| 5,879,948 A | 3/1999 | Van Pelt et al. | |
| 2005/0061110 A1 | 3/2005 | Schaedlich et al. | |

OTHER PUBLICATIONS

Oxtoby et al., "External Effects on K: Principle of Le Châtelier," Principles of Modern Chemistry, Fifth Ed., 2002, pp. 294-298.*
International Search Report, Jul. 14, 2008, p. 1, of PCT/US06/16854.

* cited by examiner

*Primary Examiner* — Scott Kastler
*Assistant Examiner* — Vanessa Velasquez
(74) *Attorney, Agent, or Firm* — Chapin IP Law, LLC; Barry W. Chapin, Esq.

(57) ABSTRACT

An oxidized mercury converter utilizes a combination of heat, reduced pressure, and dilution when converting oxidized mercury in a gas sample into elemental mercury. The converter applies heat to a gas sample to thermally convert oxidized mercury within a gas sample into elemental mercury and an oxidizing component, and thereafter reduces the pressure of the gas sample to minimize combination of the elemental mercury with other oxidizing compounds present in the gas sample and/or with byproducts of the thermal conversion (e.g., the oxidizing components). The converter thus allows an accurate analysis of the total amount of mercury, both oxidized and elemental forms, present within a gas sample without the need to use consumable reagents in the mercury conversion process.

24 Claims, 8 Drawing Sheets

METHOD AND APPARATUS FOR CONVERTING OXIDIZED MERCURY INTO ELEMENTAL MERCURY

RELATED APPLICATIONS

This application is a continuation and therefore claims priority to U.S. patent application Ser. No. 11/120,315 entitled "METHOD AND APPARATUS FOR CONVERTING OXIDIZED MERCURY INTO ELEMENTAL MERCURY", filed on May 2, 2005 now abandoned, the contents and teachings of which are hereby incorporated by reference in their entirety.

Pending U.S. patent application Ser. No. 11/120,315 is related to U.S. patent application Ser. No. 11/120,317, entitled "METHOD AND APPARATUS FOR DETECTING THE PRESENCE OF ELEMENTAL MERCURY IN A GAS SAMPLE", U.S. patent application Ser. No. 11/120,316, entitled "METHOD AND APPARATUS FOR GENERATING OXIDIZED MERCURY HAVING A MEASURABLE CONCENTRATION", and U.S. patent application Ser. No. 11/120,182, entitled "METHOD AND APPARATUS FOR MONITORING MERCURY IN A GAS SAMPLE", the contents and teachings of which are also hereby incorporated by reference in their entirety.

FIELD OF THE INVENTION

Embodiments of the invention relate to the processing of mercury-containing compounds, and more particularly to the decomposition of such compounds to elemental mercury, as for use in monitoring mercury in gaseous emissions.

BACKGROUND

Emissions from fossil fuel combustion facilities, such as flue gases of coal-fired utilities and municipal solid waste incinerators, include mercury. The emissions include vaporized mercury as elemental mercury, $Hg^0$, or as part of a mercury-containing compound (e.g., oxidized mercury). The oxidized mercury typically occurs as a form of mercury ($Hg^{+2}$), such as mercuric chloride or mercuric nitrate.

Many countries either regulate or are contemplating regulations of emissions of mercury within waste gases because of potential environmental hazards posed by the mercury emissions. Hence facilities that generate gas emissions, which may contain mercury, typically would monitor total mercury concentration in the emissions to comply with the regulations. To detect the total amount of mercury present within emissions generated by a facility, oxidized mercury in a gas sample is often converted into elemental mercury, followed by measurement of the total amount of elemental mercury within the gas sample. Several different techniques are used to perform the conversion.

For example, one technique involves the use of a wet chemical solution containing $SnCl_2$ (i.e., a wet chemistry method) to reduce the oxidized mercury of a gas sample into elemental mercury. The technique bubbles a gas emission sample through the wet chemical solution to convert $Hg^{+2}$ to $Hg^0$. The resulting elemental concentration is the sum of both the oxidized and elemental forms of mercury.

Another conversion technique involves heating an emission sample to temperatures of approximately 750° C. Heating of the $Hg^{+2}$ within the sample separates or "cracks" the oxidized mercury into an elemental component, $Hg^0$, and an oxidizing component. In certain situations, after cracking the $Hg^{+2}$ within an emission sample into $Hg^0$ using the relatively high temperature, the facility introduces $H_2$ to react with $O_2$ present within the emission sample. The combination of the $H_2$ with the $O_2$ forms water vapor that, upon immediate collection via a condensing unit, removes the separated oxidizing components or compounds such as HCl and reaction byproducts before they have the opportunity to reoxidize the elemental Hg.

SUMMARY

Conventional mechanisms and techniques for converting oxidized mercury into elemental mercury suffer from a variety of deficiencies.

As indicated above, the use of a wet chemical solution provides for conversion of oxidized mercury into elemental mercury. However, the wet chemistry method requires continuous expert operator attention, is relatively labor intensive, and may result in a composition having constituents that could interfere with accurate detection of the elemental mercury. Additionally, the wet chemical solution or reagent used in the wet chemistry method typically includes corrosive properties, becomes depleted over time and requires user monitoring and replenishment.

Also as indicated above, thermal cracking at temperatures of approximately 750° C. can be used to convert $Hg^{+2}$ to $Hg^0$. However, as the gas sample then cools, the $Hg^0$ may recombine either with other oxidizing compounds present in the gas sample or with the byproducts of the thermal cracking reaction (e.g., the oxidizing component). Thus a fraction of the $Hg^0$ may convert back to $Hg^{+2}$ before analysis, resulting in an underestimation of the concentration of the mercury within the gas sample.

Addition of $H_2$ reagent may prevent such recombination, but its use in a high temperature zone, together with the need to replenish or replace the $H_2$ source, makes this conversion approach not practical for all Hg monitoring applications.

By contrast to conventional converters that convert oxidized mercury into elemental mercury, an improved converter in accordance with embodiments of the present invention utilizes a combination of heat and reduced pressure. The converter applies heat to a gas sample to thermally convert the oxidized mercury within a gas sample into elemental mercury and an oxidizing component. The converter is also operated at a reduced pressure to minimize combination of elemental mercury with other oxidizing compounds present in the gas sample or with the byproducts of the thermal conversion (e.g., the oxidizing components). As a result, the converter allows an accurate analysis of the total amount of mercury present within a gas sample. Additionally, the improved converter limits the necessity for introduction of consumable reagents into the gas sample to aid in the mercury conversion process.

In one arrangement an oxidized mercury converter has a housing defining a first chamber and a second chamber. The first chamber is configured to receive a gas sample and contain the gas sample substantially at a first pressure. The second chamber is configured to receive the gas sample from the first chamber and contain the fluid sample substantially at a second pressure lower than the first pressure. The oxidized mercury converter has a heater in thermal communication with the first chamber for heating the gas sample received by the first chamber to convert oxidized mercury present within the fluid sample into an elemental mercury component and an oxidizing component. The oxidized mercury converter also has a flow restrictor between the first chamber and the second chamber such as, or which defines, an orifice or a narrow channel. The flow restrictor, in combination with vacuum applied to the second chamber, controls flow of the fluid sample from the first chamber to the second chamber while establishing and maintaining a pressure within the second chamber lower than the pressure in the first chamber. Reducing the pressure of the gas sample after thermal conversion (e.g., separation of oxidized mercury into an elemental mercury component and an oxidizing component) minimizes combination of the elemental mercury with the oxidizing components present in the gas sample. Recombination or other reactions of the elemental mercury can also be reduced or minimized by dilution of the gas sample.

BRIEF DESCRIPTION OF THE DRAWINGS

The foregoing and other objects, features and advantages of the methods and apparatus will be apparent from the following description of particular embodiments, as illustrated in the accompanying drawings in which like reference characters refer to the same parts throughout the different views. The drawings are not necessarily to scale, emphasis instead being placed upon illustrating the principles of the methods and apparatus.

DETAILED DESCRIPTION

A converter utilizes a combination of heat and reduced pressure when converting oxidized mercury into elemental mercury. The converter applies heat to a gas sample to thermally convert the oxidized mercury within a gas sample into elemental mercury and an oxidizing component. The converter reduces the pressure of the gas sample in conjunction with the thermal conversion to minimize combination of the elemental mercury with other oxidizing compounds present in the gas sample or with the byproducts of the thermal conversion (e.g., the oxidizing components). Thus the converter allows an accurate analysis of the total amount of mercury present within a gas sample. Additionally, the improved converter limits the necessity for introduction of consumable reagents into the gas sample to aid in the mercury conversion process.

Figure 1:
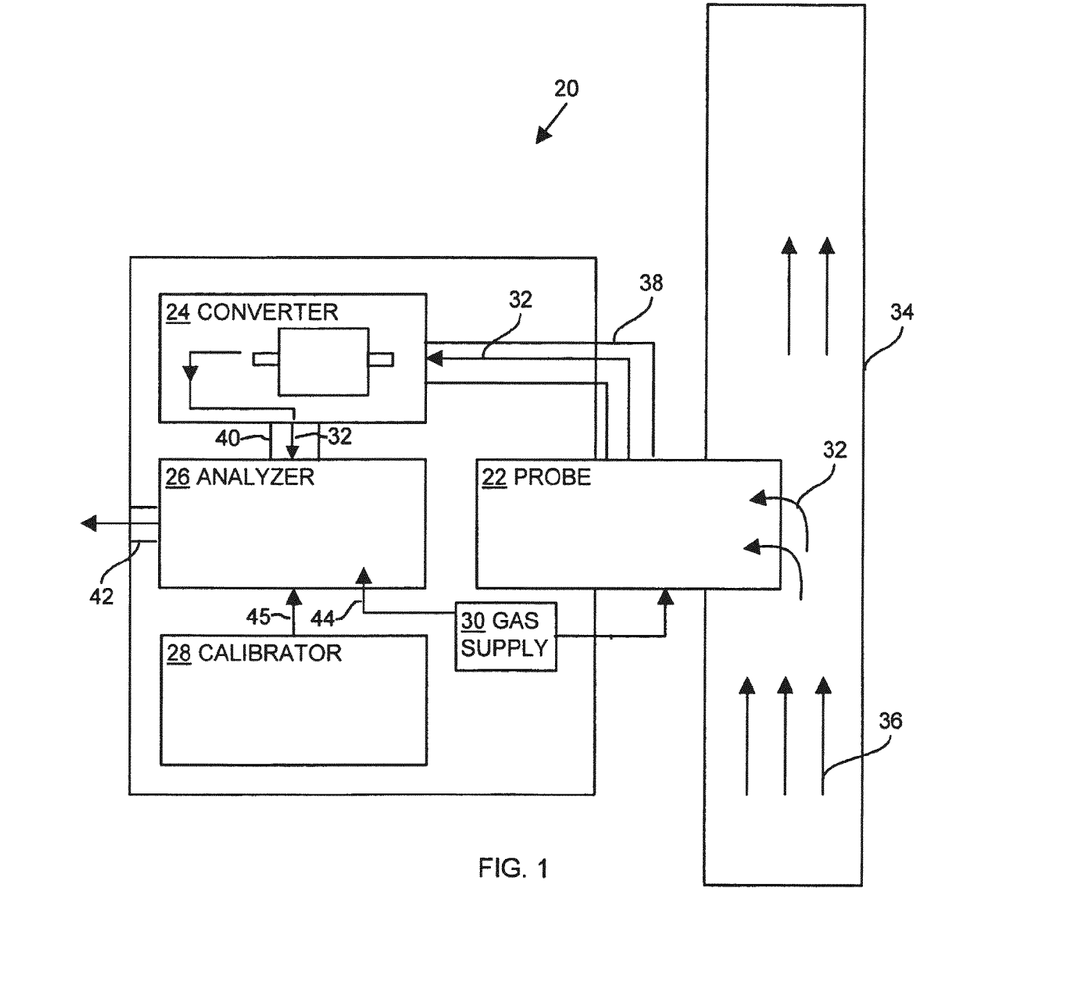
FIG. 1 is a simplified schematic of a mercury monitoring system.

FIG. 1 illustrates a mercury monitoring system 20 for monitoring total mercury within a fluid sample, such as in an effluent gas from a coal-fired power plant, in a substantially continuous manner. The mercury monitoring system 20 defines a Continuous Emission Monitoring System (CEMS). The mercury detection system 20 includes a probe 22, a converter 24, an analyzer 26, a calibrator 28, and a dilution gas supply 30.

The probe (e.g., extraction probe) 22 is configured to receive a gas sample 32 from a sample source and deliver the gas sample 32 to the converter 24. For example, the probe 22 extends into or is mounted proximate to a stack or flue 34 of a coal combustion facility and collects, as the gas sample 32, a portion of the fluid or gas (e.g., effluent) 36 flowing through the stack 34. The probe 22 can include an inertial filter that separates particulate matter (e.g., flue ash) from the gas sample 32. Surfaces of the probe 22 that contact the gas sample 32 typically have a coating (e.g., glass) that minimizes or prevents chemical reactions between the probe and mercury present within the gas sample 32.

The probe 22 is connected to the converter 24 by way of a heated conduit 38 maintained at a temperature of, for example, 150° C. The heated conduit 38 limits condensation of the gas sample 32 and "sticking" of vaporized mercury to the conduit 38 and provides efficient transport of the gas sample 32 to the converter. The heated conduit 38 receives heat from a heat source, such as an electrical resistance heater.

The converter 24 receives the gas sample 32 from the probe 22 and is configured to convert the vapor-phase species of mercury (e.g., oxidized mercury) present within the gas sample 32 into elemental mercury and to maintain the mercury in the elemental form so as to allow the analyzer 26 to detect the total amount of mercury present within a gas sample. The converter 24 converts oxidized forms of mercury, $Hg^{+2}$ (e.g., $HgCl_2$, $Hg(NO_3)_2$) into elemental mercury, $Hg^0$, by applying a relatively high temperature to the gas sample 32 and then utilizes a reduced pressure to the sample to minimize or prevent the converted elemental mercury from combining with the oxidizing compounds or components present within the gas sample 32. A more detailed description of the converter 24 is provided below.

The analyzer 26 is connected to the converter 24 by way of a heated conduit 40 (e.g., to a temperature between approximately 150° C. and 200° C.) and receives the heated and reduced pressure gas sample 32 from the converter 24. In one arrangement, the analyzer 26 is an atomic fluorescence analyzer that measures or detects an amount or a concentration of elemental mercury present within the gas sample 32. Upon completion of the detection process, the analyzer 26 exhausts the fluid or gas sample 32 to the atmosphere via an exhaust port 42.

Typically, the analyzer 26 requires periodic calibration in order to accurately detect or measure the presence of elemental mercury within a gas sample 32. The calibrator 28 couples to the analyzer 26 and allows for operator calibration of the analyzer 26. In one arrangement, the calibrator 28, in flow communication with the analyzer 26 through a line or conduit 45, provides vaporized elemental mercury to the analyzer 26 at a particular concentration, such as by using a Peltier cooler/ vapor pressure control and mass flow controllers. The analyzer 26 compares the amount of elemental mercury vapors received from the calibrator 28 with that of dry, substantially mercury-free gas, received from the dilution gas supply 30 via conduit 44. The results of such a comparison allow an operator to directly calibrate the analyzer 26.

The system 20 monitors total mercury within a gas sample 32 in a substantially continuous manner. Generally, the converter 24, such as used within the system 20, is configured to receive a gas sample 32, such as a gas sample 32 containing vaporized mercury, and to convert oxidized mercury present within the gas sample 32 into an elemental mercury component and an oxidizing component. The converter 24 also operates to reduce the pressure of the gas sample 32 to minimize or prevent recombination of the elemental mercury component with the oxidizing components.

Figure 2:
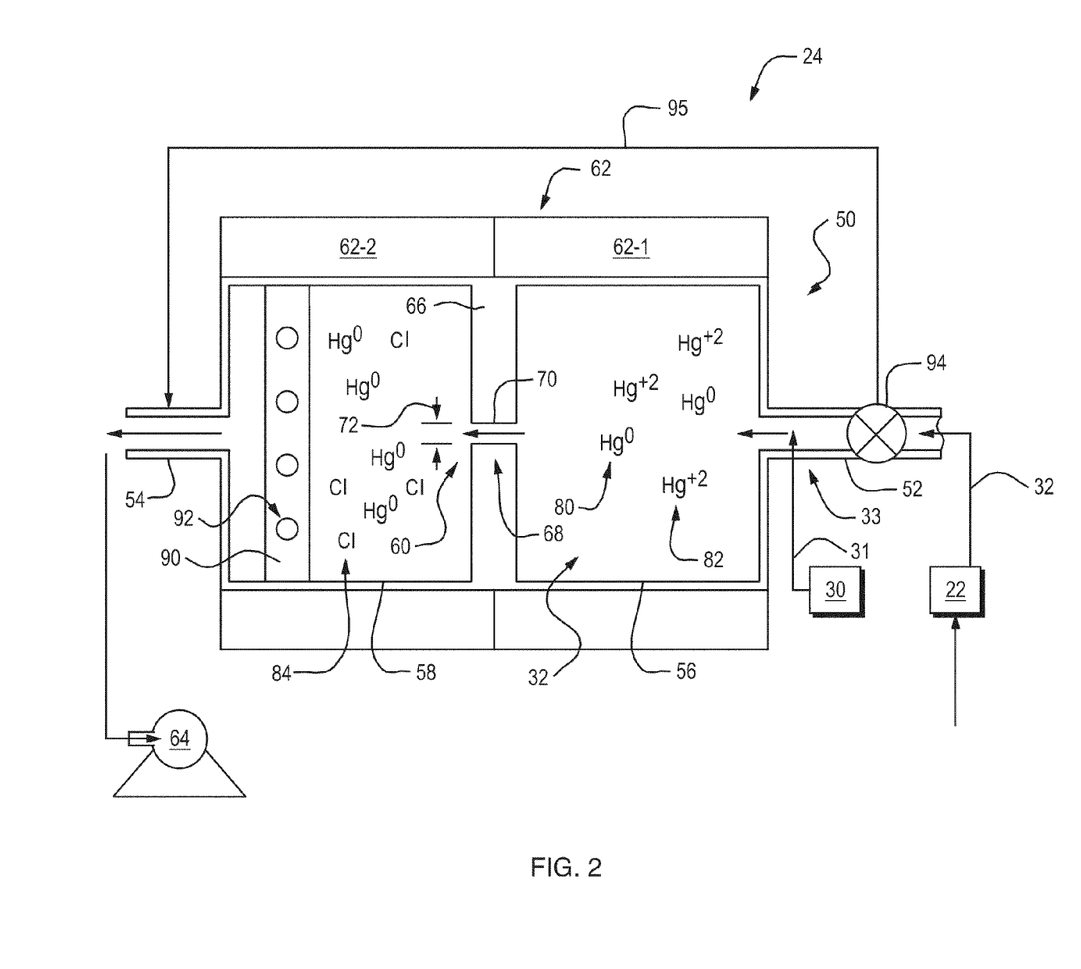
FIG. 2 illustrates an arrangement of an oxidized mercury converter according to one embodiment of the invention and which can be used with the mercury monitoring system of FIG. 1.

FIG. 2 illustrates an arrangement of the oxidized mercury converter 24. The converter 24 includes a housing 50 having an inlet 52, an outlet 54, and defining a first chamber 56 and a second chamber 58. The converter 24 also includes a pressure reduction apparatus 60 and a heater 62 in thermal communication with the housing 50.

The housing 50, in one arrangement, is a pyrolyzer formed from an alumina, quartz or glass material (e.g., high temperature quartz) into a generally cylindrical shape. The inlet 52 of the housing 50 is connected to a fluid or gas source for delivering a gas sample 32 from the fluid source to the first chamber 56 of the converter 24. For example, in one arrangement, the inlet 52 is connected to the probe 22 and receives a gas sample 32 from a stack or flue 34 of a coal combustion facility. The outlet 54 of the housing 50 is connected to the analyzer 26 illustrated in FIG. 1.

As shown in FIG. 2, in one arrangement, the outlet 54 communicates with a vacuum pump 64 which may in turn be connected to the inlet conduit 40 or outlet 42 of the analyzer 26 (e.g., the pump may be the analyzer pump). During operation, in one arrangement, the pump 64 draws the gas sample 32 into and through the probe 22, and through the converter 24 and the analyzer 26. In another arrangement, the converter 24 receives the gas sample 32 from a gas eductor associated with the probe 22. The pump 64, in such an arrangement, draws the gas sample 32 through the converter 24 and the analyzer 26.

The first chamber 56 of the converter 24 is configured to receive the gas sample 32 and contain the gas sample 32 substantially at a first pressure. For example, during operation, the pump 64 draws the gas sample 32 into the first chamber 56 from the probe 22 such that the first chamber 56 holds the gas sample at a pressure of approximately one atmosphere. The second chamber 58 is configured to receive the gas sample 32 from the first chamber 56 and contain the gas sample 32 substantially at a second pressure, the second pressure being less than the first pressure. As described below, the second chamber 58 operates in conjunction with the pump 64 and a pressure reduction apparatus 60 to contain the fluid or gas sample 32 at the second, decreased pressure.

The pressure reduction apparatus 60, together with the pump 64, establishes and maintains a reduced pressure of the gas sample 32 in the second chamber 58 relative to the pressure in the first chamber 56. To facilitate this, the pressure reduction apparatus 60 is, or includes, a flow restrictor 68 defining a channel or opening 70, such as a critical orifice, oriented between the first chamber 56 and the second chamber 58 of the housing 50. The flow restrictor 68 can be formed as a nozzle or a structure defining the orifice. In one arrangement, the flow restrictor 68 is formed within a wall 66 of the housing 50 which is common to the first chamber 56 and the second chamber 58—that is, separates the chambers 56, 58 one from another. The flow restrictor 68 creates a drop in the pressure of the gas sample 32 between approximately 0.1 atmospheres and 0.3 atmospheres as the pump 64 draws the gas sample 32 through the flow restrictor 68 from the first chamber 56 to the second chamber 58.

For example, during operation, the pump 64 draws the gas sample 32 from the inlet 52 into the first chamber 56. The first chamber 56 holds or contains the gas sample 32 at a first fluid pressure, such as at a pressure of one atmosphere (e.g., atmospheric pressure). The pump 64 further draws the gas sample 32 from the first chamber 56, through the flow restrictor 68, and into the second chamber 58. While the flow restrictor 68 allows flow of the gas sample 32 from the first chamber 56 to the second chamber 58, the flow restrictor 68 limits the flow rate of the gas sample 32 from the first chamber 56 to the second chamber 58. The size of the channel 70 of the flow restrictor 68 allows the pump 64 to create and maintain a low fluid pressure within the second chamber 58—between approximately 0.1 and 0.3 atmospheres, for example.

In one arrangement, a user can adjust a diameter 72 of the channel 70 of the flow restrictor 68 and a fluid flow rate of the pump 64 to achieve a pressure reduction of the gas sample between approximately 0.1 and 0.3 atmospheres. For example, assume a case where the converter 24 has a flow restrictor 68 having a 500 milliliters/minute critical orifice (e.g., a diameter of approximately 0.001 inches) and the converter 24 couples to the pump 64 having vacuum flow rate of 500 milliliters/minute. During operation of the pump 64, the flow restrictor 68 reduces the pressure of the gas sample to between approximately 0.1 and 0.3 atmospheres.

The heater 62 is operable to heat the gas sample 32 within the housing 50 to convert oxidized mercury 82 present within the gas sample 32 into an elemental mercury component 80 and an oxidizing component 84. For example, the heater 62 can increase the temperature of the gas sample 32 within the first chamber 56 to approximately 750° Celsius (e.g., or within a range between approximately 650° C. and 800° C.). As will be described below, such a temperature thermally cracks the oxidized mercury 82 present within the gas sample 32 into an elemental mercury component 80 and an oxidizing component 84. In one arrangement, the heater 62 is an electrical resistance heater that provides radiant heat to the gas sample 32 within the housing 50.

Figure 3:
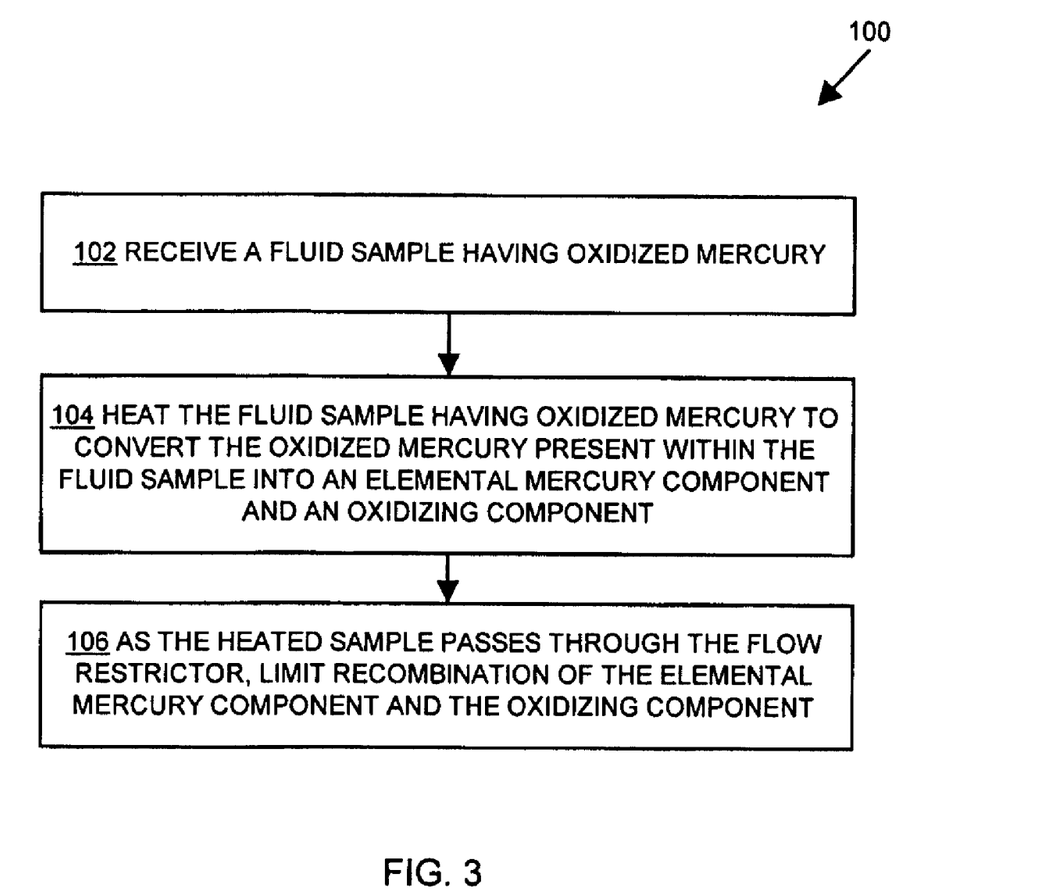
FIG. 3 is a flow chart of a procedure performed by the oxidized mercury converter of FIG. 2.

FIG. 3 is a flow chart 100 of a procedure performed by the oxidized mercury converter 24 during its operation.

With reference to FIG. 3, and also FIGS. 1 and 2, in step 102, the converter 24 receives a fluid sample 32 having oxidized mercury. For example, during operation, the probe 22 receives a flue gas sample 32 from a stack or flue 34 of a coal combustion facility. The gas sample 32 includes vaporized mercury in both elemental) ($Hg^0$) 80 and oxidized ($Hg^{+2}$) 82 forms. The pump 64, coupled to the outlet 54 of the converter 24 converter 26 (the pump 64 is preferably downstream of an analyzer 26), generates a vacuum within the housing 50 and causes the gas sample 32 to flow from the probe 22 to and through the converter 24. The first chamber 56 of the converter 24 converter 26 receives the gas sample 32 and holds the sample 32 at a pressure such as approximately one atmosphere).

In step 104, the converter 24 converter 26 heats the fluid sample 32 having oxidized mercury to convert the oxidized mercury 82 present within the fluid sample 32 into an elemental mercury component 80 and an oxidizing component 84. For example, in a process known as thermal cracking, the heater 62 applies thermal energy to the first chamber 56 of the housing 50 to increase the temperature of the gas sample 32 within the first chamber 56 to temperature of approximately 750° C. As the oxidized mercury 82 within the gas sample 32 reaches the temperature of approximately 750° C., the oxidized mercury 82 separates into an elemental mercury component 80 and an oxidizing component 84, such as chlorine.

In step 106, as the heated fluid sample passes through the flow restrictor, the converter 24 limits recombination of the elemental mercury component and the oxidizing component. For example, the vacuum pump and flow restrictor 68 can cause the pressure of the heated gas sample 32 to decrease from approximately 1 atmosphere (e.g., as contained within the first chamber 56) to between approximately 0.1 and 0.3 atmospheres (e.g., as contained within the second chamber 58). By reducing the pressure of the heated gas sample 32, relative to the pressure within the first chamber 56, the converter 24 reduces the number of elemental mercury components 80 and oxidizing components 84 within the second chamber 58. With the heated gas sample 32 held under a vacuum (e.g., held at a lower pressure relative to the pressure of the gas sample 32 within the first chamber 56), the reduced pressure or vacuum limits recombination reaction between the separated elemental mercury 80 and oxidizing elements 84, as thermally separated within the first chamber 56. Additionally, the reduced pressure or vacuum limits combination of the elemental mercury 80 within the gas sample 32 with other components, such as hydrochloric acid (HCl), which may be present within the gas sample 32.

As the heated gas sample 32 enters the second chamber 58 from the first chamber 56, and as it passes from the converter 24 towards the analyzer, the temperature of the heated gas sample 32 can decrease, thereby increasing the probability for the elemental mercury 80 and oxidizing elements 84 present within the gas sample 32 to recombine. However the pressure of the gas sample reduces the number of elemental mercury components 80 and oxidizing components 84 within the gas sample 32. Such reduction of the number of elemental mercury components 80 and oxidizing components 84 within the gas sample 32 reduces chemical recombination of the elemental mercury components 80 with the oxidizing components 84. Thus when the converter 24 delivers the gas sample 32 from the second chamber 58 to a fluid destination, such as the analyzer 26, the analyzer 26 can detect, in a relatively accurate manner, the total amount of elemental mercury 80 (e.g., vaporized elemental mercury) within the gas sample 32.

As indicated above, in one arrangement, as the heated gas sample 32 enters the second chamber 58 from the first chamber 56, the temperature of the heated gas sample 32 decreases, thereby increasing the probability for the elemental mercury 80 and oxidizing elements 84 present within the gas sample 32 to recombine. In order to further minimize combination of the elemental mercury 80 and oxidizing elements 84 within the second chamber 58, the converter 24 can include a heater in thermal communication with the second chamber 58. Returning to FIG. 2, in one arrangement, the heater 62 includes a first heater portion 62-1 and a second heater portion 62-2. The first heater portion 62-1 is in thermal communication with the first chamber 56 and the second heater portion 62-2 is in thermal communication with the second chamber 58.

During operation, the first heater portion 62-1 heats the gas sample 32 within the first chamber 56, to a temperature of approximately 750° C., to crack the oxidized mercury 82 in the gas sample 32 into an elemental mercury component 80 and an oxidizing component 84. As the gas sample flows into the second chamber 58, the pressure reduction apparatus 60 (e.g., the flow restrictor 68) in combination with the pump 64 reduces the pressure of the gas sample 32 such that the gas sample is held at reduced pressure in the second chamber 58. The second heater portion 62-2 then applies heat to the second chamber 58 to help maintain the temperature of the gas sample 32 within the second chamber 58. For example, the second heater portion 62-2 also heats the gas sample 32 within the second chamber 58 to temperature of approximately 750° C. With such heating, the second heater portion 62-2 helps to maintain separation of the elemental mercury components 80 from the oxidizing components 84.

In certain cases, the gas sample 32 can require additional processing (e.g., removal of mercury reactive components) to limit or inhibit reoxidation of elemental mercury 80 within the gas sample 32 prior to its analysis. In one arrangement, to minimize recombination of converted elemental mercury components 80 and oxidizing components 84, the converter 24 includes a chemical scrubber 90, as illustrated in FIG. 2.

The chemical scrubber 90 acts to remove or reduce the presence of certain mercury reactive components within the gas sample 32. The chemical scrubber 90 can be mounted within the housing 50 downstream of flow restrictor 68 the outlet 54 of the converter 24. Such orientation ensures that during operation the gas sample 32 flows through or in proximity to the chemical scrubber 90 as the gas sample 32 travels from the inlet 52 of the housing 50 to the outlet 54 of the housing 50, thereby allowing the chemical scrubber 90 to remove or reduce the presence of certain mercury reactive components within the gas sample 32. In one arrangement, the chemical scrubber 90 includes an acid gas scrubbing material 92, e.g., calcium hydroxide ($Ca(OH)_2$). The chemical 92 traps certain components of the gas sample 32 (e.g., acid gases such as hydrochloric acid (HCl), and free chlorine radicals) to minimize combination of the acid gas components with elemental mercury 80 within the gas sample 32. That is, the chemical scrubber 90 permits elemental mercury ($Hg^0$) 80 to pass to the analyzer but removes acid gas components that could otherwise recombine with the elemental mercury 80.

Figure 8:
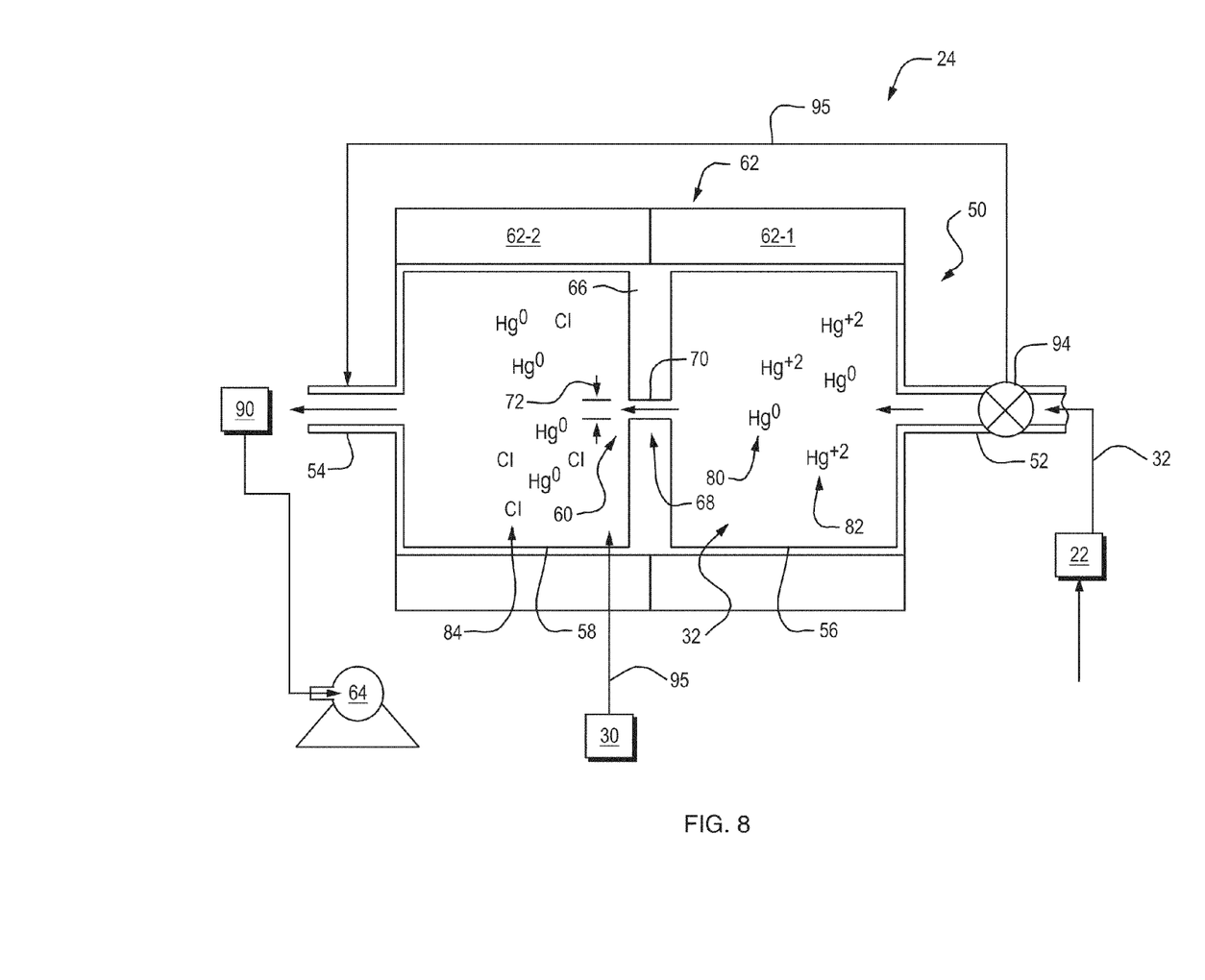
FIG. 8 illustrates an arrangement of the oxidized mercury converter of FIG. 2.

As an alternative to the arrangement shown in FIG. 2, a chemical scrubber 90 can be provided within a separate housing downstream of the housing 50, such as illustrated in FIG. 8. Such an arrangement may facilitate replacement of the scrubber material of the chemical scrubber.

To further reduce or minimize the potential for recombination of elemental mercury into mercury-containing compounds, as in the second chamber 58 of the converter 24 or during the passage of a gas sample from the converter 24 to an analyzer 26, the dilution gas supply 30 can provide dilution gas, such as dry, mercury-free gas, into the sample stream via a conduit 31.

For example, as illustrated in FIG. 2, the dilution gas supply 30 provides mercury-free dilution gas to the converter 24. In one arrangement, the conduit 31 connects to a gas line of the system 20 upstream of the converter 24 near the inlet 52 of the converter 24. In another arrangement, the conduit 31 connects to a second inlet 33 of the housing 50. The dilution gas combines with the gas sample 32 to dilute the concentrations of oxidized mercury 82, elemental mercury 80 (e.g., vaporized mercury), and oxidizing components 84 within the gas sample 32 received by the converter 24. For example, the dilution gas supply 30 dilutes the oxidized mercury 82, elemental mercury 80, and oxidizing component 84 concentrations within the gas sample 32 at dilution ratios from between approximately 10:1 to 250:1. By diluting the amount of oxidized mercury 82, elemental mercury 80, and oxidizing components 84 present within the gas sample 32, the dilution gas supply 30 reduces the relative concentrations of the reactive species (e.g., the elemental mercury components 80 and the oxidizing components 84) within the gas sample 32. The system 20 also can be operated to detect the concentration of elemental mercury of a gas sample 32 (e.g., from a combustion source) without requiring the system 20 to convert oxidized mercury present within the gas sample 32 into nonoxidized mercury (e.g., elemental mercury). To permit this, the system 20 includes a flow bypass element 94 upstream of the converter 24 or connected to its inlet 52, as shown in FIG. 2. When activated, the flow bypass element 94 directs the gas sample 32, received by the inlet 52, through a conduit 95 and to the outlet 54 of the housing 50, thereby bypassing the first chamber 56 and the second chamber 58 of the housing 50. Such bypassing prevents the gas sample 32 from becoming exposed to a relatively high heat provided in the chambers 56, thus not cracking the oxidized mercury 82 present within the gas sample 32. This allows the analyzer 26 to detect only the elemental mercury originally present within the gas sample 32.

Figure 4:
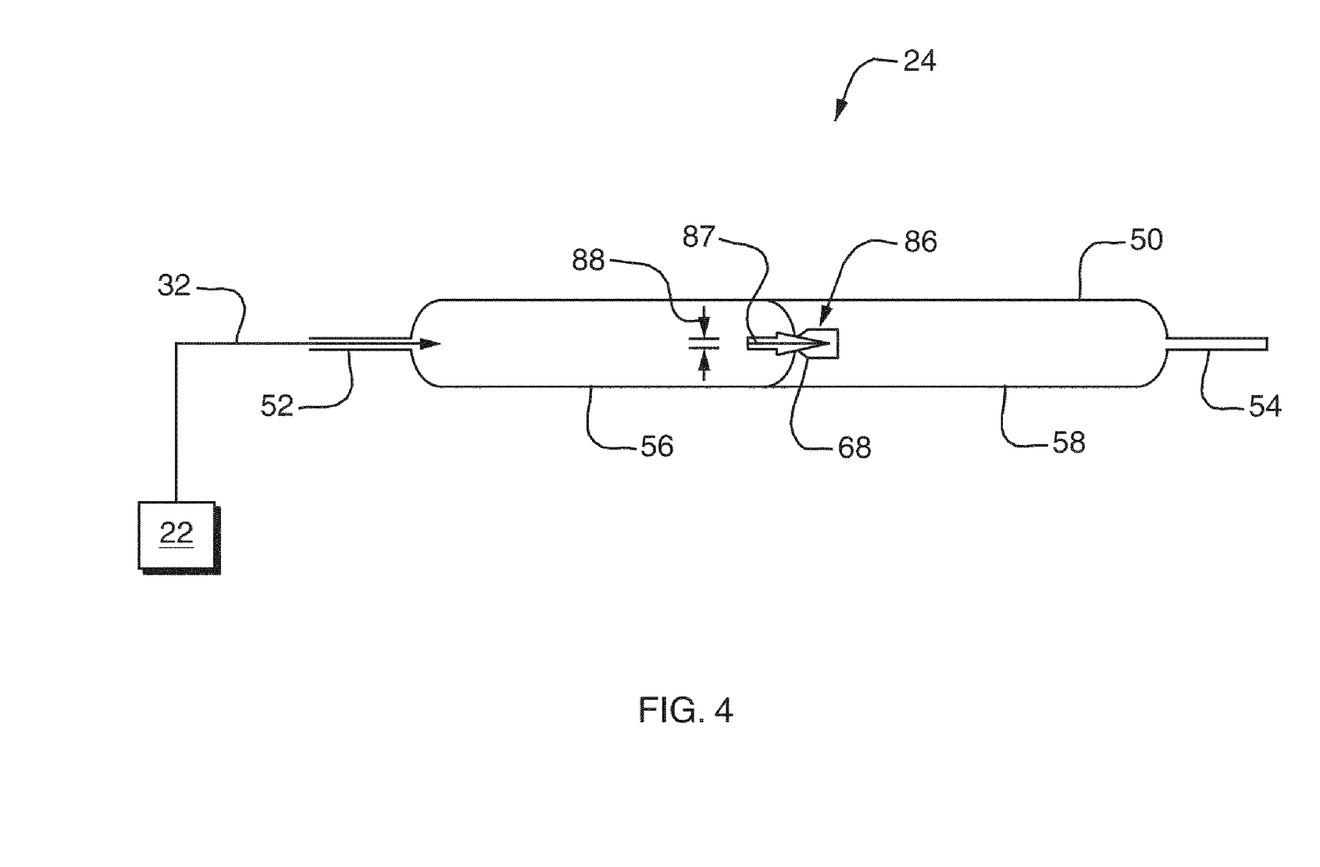
FIG. 4 illustrates an arrangement of the oxidized mercury converter of FIG. 2.
Figure 5:
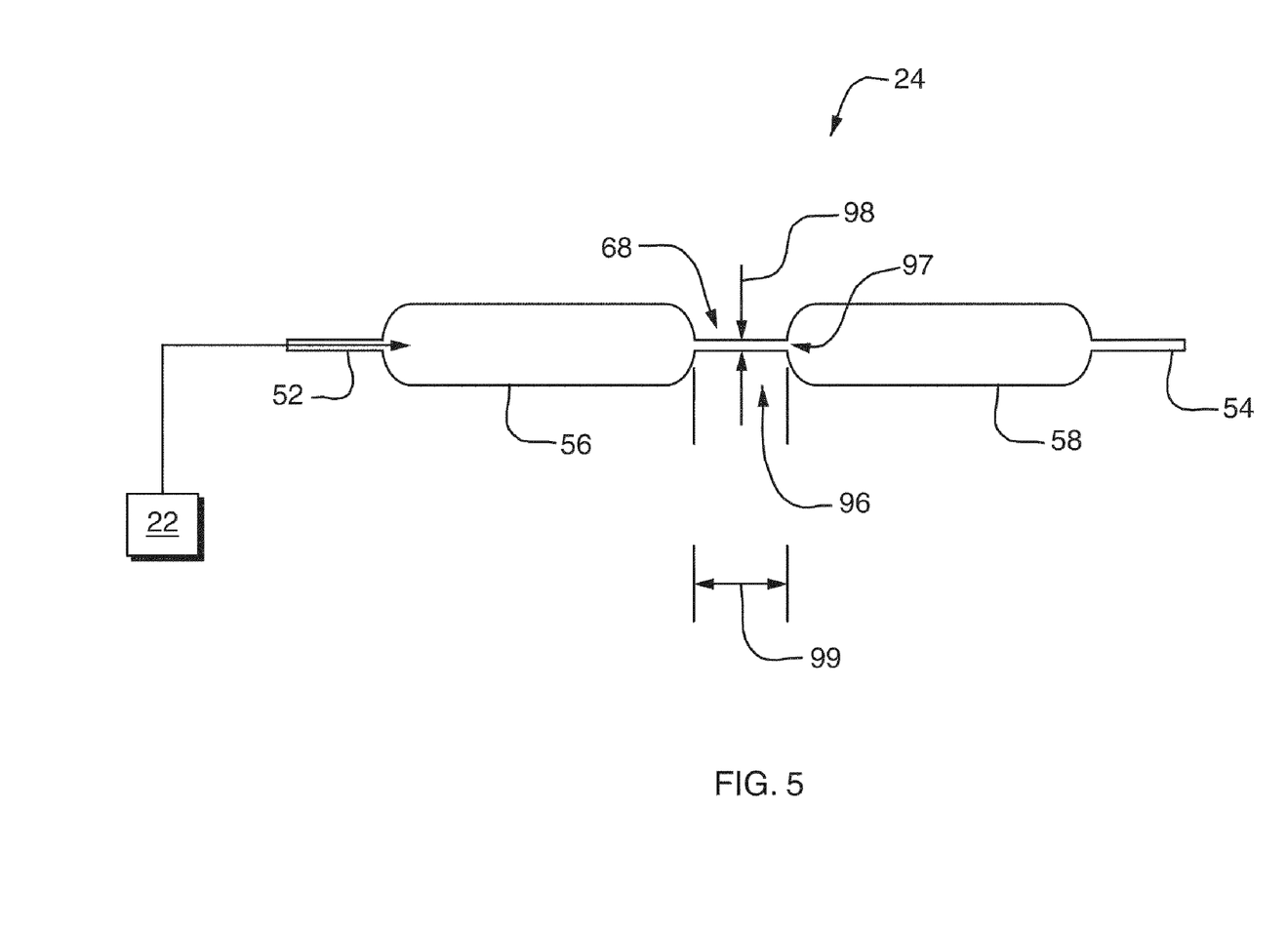
FIG. 5 illustrates an alternate arrangement of the oxidized mercury converter of FIG. 2.

As indicated above with respect to FIG. 2, the pressure reduction apparatus 60 (e.g., the flow restrictor 68 in combination with the pump 64) helps reduce the pressure of the gas sample 32 within the housing 50, relative to a pressure of the gas sample 32 received by the inlet 52. FIGS. 4 and 5 illustrate alternate configurations for the pressure reduction apparatus 60.

FIG. 4 illustrates a flow restrictor 68 configured as a nozzle 86 between the first chamber 56 and the second chamber 58 of a converter 24. The nozzle 86 defines a channel or orifice 87 having a diameter 88 that limits flow rate of the gas sample 32 from the first chamber 56 to the second chamber 58. The use of a separately attachable flow restrictor 68 (e.g., the nozzle 86) allows installation of different flow restrictors 68 having varying diameters to achieve different desired flow rates.

FIG. 5 illustrates another arrangement of a flow restrictor 68 for a converter 24. As shown, the flow restrictor 68 is a neck portion 96 integrally formed with the housing 50 and connecting the first chamber 56 to the second chamber 58. The neck portion 96 separates the first chamber 56 from the second chamber 58 by a distance 99. The neck portion 96 defines a channel or orifice 97 having a diameter 98 which allows flow of the gas sample 32 from the first chamber 56 to the second chamber 58 and that limits a flow rate of the gas sample 32 from the first chamber 56 to the second chamber 58. For example, in one arrangement, the orifice 97 of the neck portion 96 permits a maximum flow rate of approximately 500 milliliters/minute. The integral arrangement shown in FIG. 5 allows manufacture of the first chamber 56, the second chamber 58, and the neck portion 96 in a single manufacturing procedure from a single material (e.g., high temperature quartz), eliminating steps needed to install a separate pressure reduction apparatus within the housing 50.

Figure 6:
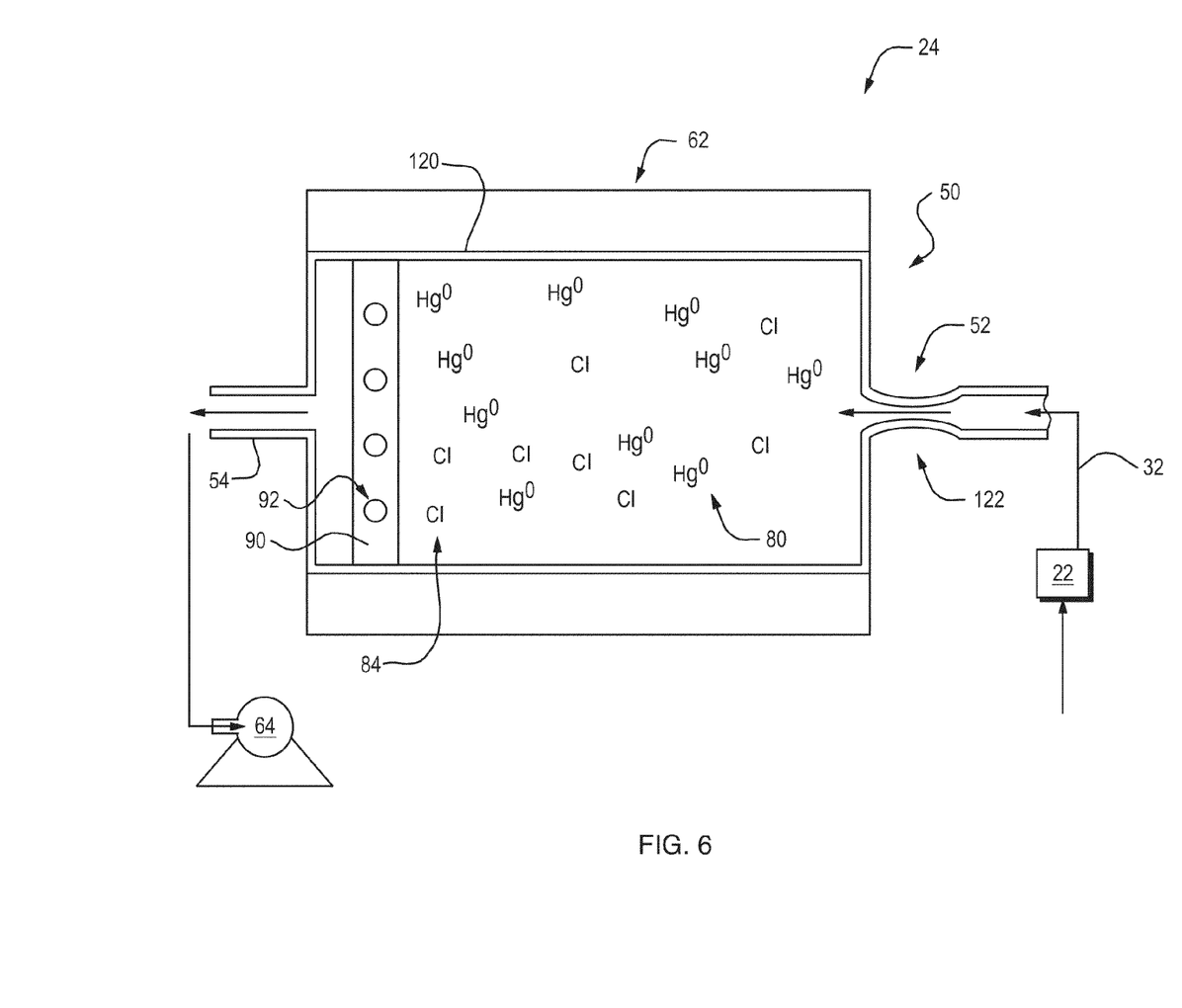
FIG. 6 illustrates an alternate arrangement of the oxidized mercury converter of FIG. 2.

FIG. 6 illustrates an alternate arrangement of the converter 24 where the converter 24 defines a single chamber 120 and includes a flow restrictor 122 located upstream (e.g., at the inlet 52) of the converter 24. The flow restrictor 122, in combination with the pump 64, reduces the pressure of the gas sample 32 as the gas sample 32 enters the chamber 120. During operation, the flow restrictor 122, in combination with the pump 64, reduces the pressure of the gas sample 32 from atmospheric pressure to between approximately 0.1 and 0.3 atmospheres. As the converter 24 receives the reduced pressure gas sample 32, the heater 62 applies heat to the gas sample 32 to thermally crack the oxidized mercury within the reduced pressure gas sample 32. The single chamber 120 maintains the gas sample at the reduced pressure. With the flow restrictor 122 located upstream to the converter 24, the converter 24 maintains the reduced pressure of the gas sample 32 to reduce or limit recombination of the elemental mercury components 80 and the oxidizing components 84.

Figure 7:
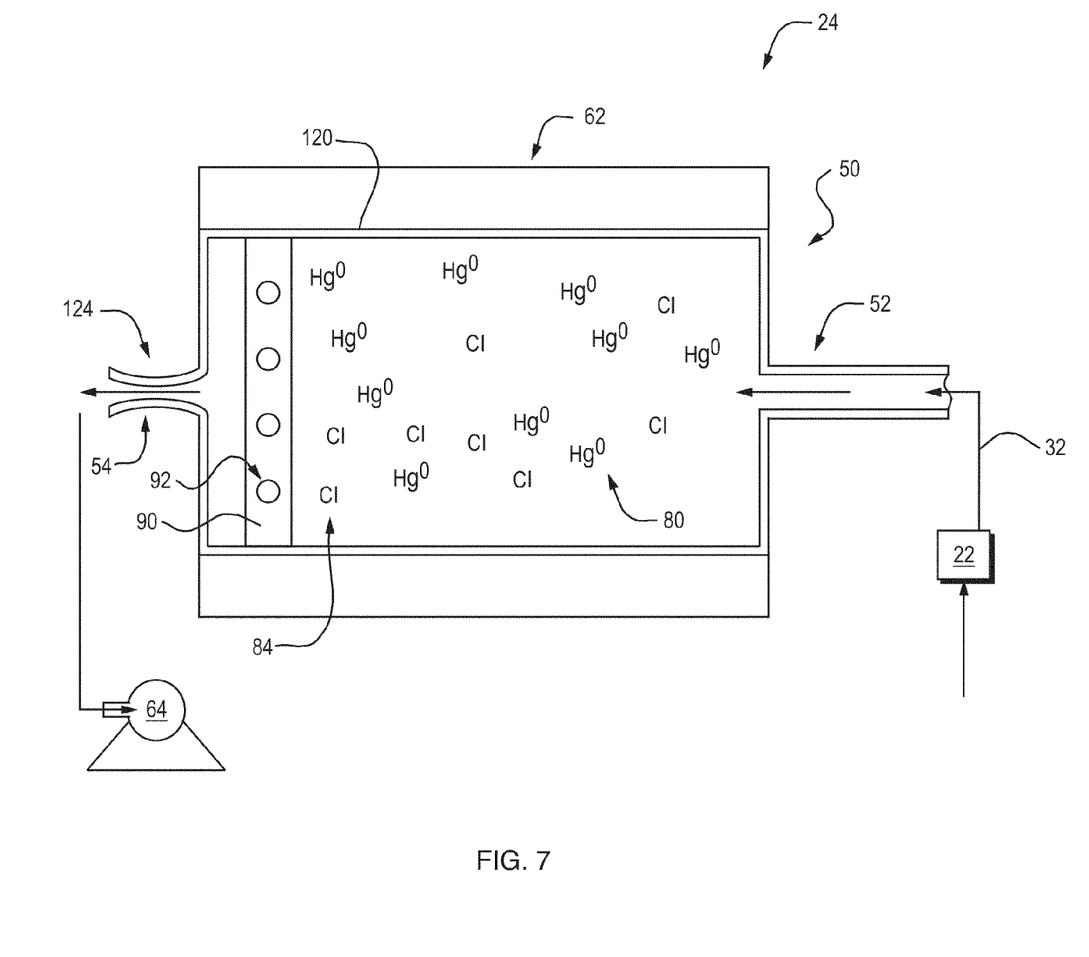
FIG. 7 illustrates another arrangement of the oxidized mercury converter of FIG. 2.

FIG. 7 illustrates an alternate arrangement of the converter 24 where the converter 24 defines the single chamber 120 and includes a flow restrictor 124 located downstream (e.g., at the outlet 54) of the converter 24. The flow restrictor 124, in combination with the pump 64, reduces the pressure of the gas sample 32 as the gas sample 32 exits the chamber 120. During operation, the converter 24 receives the gas sample 32 within the single chamber 120 and the heater 62 applies heat to the gas sample 32 to thermally crack the oxidized mercury within the gas sample 32. As the gas sample 32 exits the single chamber 120, the flow restrictor 124, in combination with the pump 64, reduces the pressure of the gas sample 32 from atmospheric pressure to between approximately 0.1 and 0.3 atmospheres. With the flow restrictor 124 located downstream to the converter 24, the converter 24 delivers a reduced pressure gas sample 32 to the analyzer 26 within the system 20. By reducing the pressure of the thermally cracked gas sample 32, the converter 24 reduces or limits recombination of the elemental mercury components 80 and the oxidizing components 84 within the gas sample as the gas sample travels to the analyzer 26.

While the methods and apparatus have been particularly shown and described with references to embodiments thereof, it will be understood by those skilled in the art that various changes in form and details may be made therein without departing from the spirit and scope of the methods and apparatus as defined by the appended claims.

For example, as illustrated in FIG. 1, the probe 22 retrieves a gas sample 32 from a stack 34 and delivers the gas sample 32 to the converter 24 by way of a heated conduit 38. The heated conduit 38 limits condensation of the gas sample 32 and "sticking" of vaporized mercury (e.g., $Hg^{+2}$ species) to the conduit 38. Such illustration is by way of example only. In one arrangement the converter 24 is oriented in close proximity to the gas sample source (e.g., stack). For example, the converter 24 can be located near the point of extraction of sample 32 from the utility stack 34 (e.g. in relatively close proximity to the probe 22) or built into the extraction probe 22 (e.g., integrally formed as part of the probe 22). Such a configuration minimizes or eliminates the necessity for the heated conduit 38 between the probe 22 and the converter 24.

Also, in one arrangement as described above, the heater is 62 is configured as having first heater portion 62-1 oriented in thermal communication with the first chamber 56 and a second heater portion 62-2 oriented in thermal communication with the second chamber 58 of the converter 24. As described, the first heater portion 62-1 may heat the gas sample 32 to a temperature of approximately 750° C. in order to thermally crack the elemental mercury components 80 from the oxidizing components 84. Also as described, the second heater portion 62-2 also heats the gas sample 32 within the second chamber 58 to temperature of approximately 750° C. to maintain separation of the elemental mercury components 80 from the oxidizing components 84. Such description is by way of example only. In one arrangement, the second heater 62-2 operates independently of the first heater 62-1 and maintains the second chamber 58 at a different temperature than that of the first chamber 56—e.g., greater than, less than, or equal to the temperature of the gas sample in the first chamber 56.

Also as indicated above and as illustrated in FIG. 2, the dilution gas supply 30 provides a dilution gas to a flow line upstream of the converter 24. In an alternative arrangement, as shown in FIG. 8, the dilution gas supply 30 may introduce dilution gas into the second chamber 58 of the housing 50 of the converter 24 by way of a second inlet 95 associated with the housing 50. By diluting the oxidized mercury 82, elemental mercury 80, and oxidizing components 84 present within the gas sample 32 within the second chamber 58, the dilution gas supply 30 reduces the relative concentrations of the reacting species (e.g., the elemental mercury components 80 and the oxidizing components 84) within the gas sample 32 (e.g., within the second chamber 58).

As illustrated in FIG. 1, the chemical scrubber 90 is located within the housing 50 of the converter 24. Such illustration is by way of example only. In another arrangement, as illustrated in FIG. 8, the chemical scrubber 90 is located external to the housing 50 of the converter 24. Such an arrangement allows a user to easily change or replace the acid scrubbing material 92 (e.g., calcium hydroxide) of the scrubber 90. While the external scrubber 90 is illustrated as being located downstream from the outlet 54, the external scrubber 90 can also be located at an upstream location, in proximity to the inlet 52.

What is claimed is:

1. A method comprising:
receiving, in a chamber, a fluid sample from a conduit;
controlling a pressure of the fluid sample in the chamber to be less than a pressure of the fluid sample in the conduit; and
heating the fluid sample in the chamber to convert oxidized mercury present within the fluid sample into an elemental mercury component and an oxidizing component, wherein the pressure of the fluid sample in the chamber is controlled to be lower than the pressure of the fluid sample in the conduit to inhibit a recombination of the elemental mercury component and the oxidizing component.

2. The method as in claim 1 further comprising:
restricting, via a flow restrictor, a flow of the fluid sample through the chamber to limit recombination of the elemental mercury component in the chamber with the oxidizing component.

3. The method as in claim 2, wherein restricting the flow further comprises:
reducing a pressure of the fluid sample in the chamber between approximately 0.1 and 0.3 atmospheres.

4. The method as in claim 1 further comprising:
adding a substantially mercury-free fluid to the fluid sample in the chamber to dilute the fluid sample in the chamber.

5. The method as in claim 1 further comprising:
reducing recombination of the elemental mercury and the oxidizing agent by adding substantially mercury-free fluid to the fluid sample.

6. The method as in claim 1 further comprising:
diluting the fluid sample in the chamber based on a dilution ratio between approximately 10:1 to 250:1.

7. The method as in claim 1 further comprising:
disposing a flow restrictor at an inlet of the chamber between the conduit and the chamber, the flow restrictor having a corresponding diameter opening to enable a flow of the fluid sample received from the conduit to pass through the flow restrictor to the chamber.

8. The method as in claim 7 further comprising:
controlling a pressure of the fluid sample in the chamber to be less than the pressure of the fluid sample in the conduit by drawing, via a vacuum, the fluid sample out of the chamber through an outlet of the chamber.

9. The method as in claim 8, wherein the pressure of the fluid sample in the conduit is approximately 1 atmosphere, the method further comprising:
controlling the pressure of the fluid sample in the chamber between approximately 0.1 and 0.3 atmospheres to limit recombination of the elemental mercury component and the oxidizing component in the chamber.

10. The method as in claim 7 further comprising:
via a dilution gas supply, supplying dilution gas into the chamber to dilute the fluid sample in the chamber, dilution of the fluid sample in the chamber with the dilution gas reducing recombination of the elemental mercury component and the oxidizing agent component.

11. The method as in claim 10 further comprising:
diluting the fluid sample in the chamber by a dilution ratio of between approximately 10:1 to 250:1.

12. The method as in claim 9 further comprising:
analyzing the fluid sample outputted from the chamber to measure a concentration of the elemental mercury component in the fluid sample.

13. The method as in claim 12, wherein heating the fluid sample in the chamber includes heating the fluid sample in the chamber to a temperature of between approximately 650 degrees Celsius and 800 degrees Celsius.

14. The method as in claim 1 further comprising:
applying a vacuum to an outlet of the chamber to draw the fluid sample out of the chamber and reduce a pressure of the fluid sample in the chamber.

15. The method as in claim 7 further comprising:
heating the conduit to facilitate a flow of the fluid sample through the inlet into the chamber.

16. The method as in claim 1, wherein heating the fluid sample in the chamber includes heating the fluid sample in the chamber to a temperature of between approximately 650 degrees Celsius and 800 degrees Celsius.

17. The method as in claim 1 further comprising:
disposing a pressure reduction apparatus at an inlet of the chamber between the chamber and the conduit; and
via the pressure reduction apparatus, controlling the pressure of the chamber to be less than the pressure of the fluid sample in the conduit in order to limit recombination of the elemental mercury component and the oxidizing component in the chamber.

18. The method as in claim 1 further comprising:
controlling the pressure of the fluid sample in the chamber to be between approximately 0.1 and 0.3 atmospheres; and wherein the pressure of the fluid sample in the conduit is approximately 1 atmosphere.

19. The method as in claim 1 further comprising:
removing mercury reactive components in the chamber to reduce a recombination of the elemental mercury.

20. The method as in claim 1 further comprising:
via a pressure reduction apparatus disposed at an inlet of the chamber between the chamber and the conduit, controlling the pressure of the chamber to be less than the pressure of the fluid sample in the conduit in order to limit recombination of the elemental mercury component and the oxidizing component in the chamber; and
via a scrubber disposed in the chamber, removing mercury reactive components in the chamber to remove acid gas components in the chamber.

21. The method as in claim 1 further comprising:
introducing a chemical in the chamber to remove components from the chamber and reduce recombination of the elemental mercury with the components.

22. The method as in claim 1 further comprising:
disposing a flow restrictor at an inlet of the chamber between the conduit and the chamber, the flow restrictor having a corresponding diameter opening to enable a flow of the fluid sample received from the conduit to pass through the flow restrictor to the chamber;
controlling a pressure of the fluid sample in the chamber to be less than the pressure of the fluid sample in the conduit by drawing, via a vacuum, the fluid sample out of the chamber through an outlet of the chamber, wherein the pressure of the fluid sample in the conduit is approximately 1 atmosphere and wherein the pressure of the fluid sample in the chamber is between approximately 0.1 and 0.3 atmospheres to limit recombination of the elemental mercury component and the oxidizing component in the chamber.

23. The method as in claim 22 further comprising:
via a dilution gas supply, supplying dilution gas into the chamber to dilute the fluid sample in the chamber, dilution of the fluid sample in the chamber with the dilution gas reducing recombination of the elemental mercury component and the oxidizing agent component; and via supplying the dilution gas, diluting the fluid sample in the chamber by a dilution ratio of between approximately 10:1 to 250:1.

24. A method comprising:

receiving, in a chamber, a fluid sample from a conduit;

initiating conversion of oxidized mercury present in the fluid sample into an elemental mercury component and an oxidizing component; and wherein initiating the conversion includes:

heating the fluid sample in the chamber; and controlling a pressure of the fluid sample in the chamber to be less than the pressure of the fluid sample in the conduit, the pressure of the fluid sample in the chamber reduced to a pressure between 0.1 and 0.3 atmospheres to inhibit a recombination of the elemental mercury component and the oxidizing component.

* * * * *